United States Patent [19]

Kavehrad et al.

[11] Patent Number: 5,192,863
[45] Date of Patent: Mar. 9, 1993

[54] OPTICAL TAPER FOR INCREASING THE EFFECTIVE AREA OF A PHOTODIODE IN ATMOSPHERIC FREE SPACE COMMUNICATIONS APPLICATIONS

[75] Inventors: Mohsen Kavehrad, Cumberland; Gang Yun, Vanier, both of Canada

[73] Assignee: The University of Ottawa, Ottawa, Canada

[21] Appl. No.: 644,571

[22] Filed: Jan. 23, 1991

[30] Foreign Application Priority Data

Jan. 24, 1990 [CA] Canada ............................ 2008515

[51] Int. Cl.⁵ .............................................. H01J 40/14
[52] U.S. Cl. ........................ 250/227.24; 250/227.32; 385/43
[58] Field of Search ................. 250/227.32, 227.24; 385/43

[56] References Cited

U.S. PATENT DOCUMENTS

| 3,756,688 | 9/1973 | Hudson et al. | 385/43 |
| 3,870,396 | 3/1975 | Racki et al. | 385/43 |
| 4,076,378 | 2/1978 | Cole | 385/43 |

FOREIGN PATENT DOCUMENTS 0080894  3/1989  Japan .............................. 250/227.32

Primary Examiner—David C. Nelms
Assistant Examiner—Que T. Le
Attorney, Agent, or Firm—Dennison, Meserole, Pollack & Scheiner

[57] ABSTRACT

An optical receiver includes a photodiode having a surface area of suitable dimensions to permit reception of a signal at a high bit rate. Also, the optical receiver includes an optical taper having a head and a tail. The head is of greater diameter than the tail, and co-axial with the tail. The tail is aligned with the photodiode.

8 Claims, 3 Drawing Sheets

RECEIVED BEAM

PHOTODETECTOR

OPTICAL TAPER

MERIDIONAL PLANE

GLASS TAPER

SAGITTAL PLANE r

γ

θ

MERIDIONAL PLANE

TAPER AXIS

INCIDENT LIGHT

THE FIRST REFLECTION

THE POSITION OF THE IMAGINATIVE (N+1)TH REFLECTION

α

θd

INCIDENT LIGHT

LINEAR TAPER

THE LAST REFLECTION

OPTICAL TAPER FOR INCREASING THE EFFECTIVE AREA OF A PHOTODIODE IN ATMOSPHERIC FREE SPACE COMMUNICATIONS APPLICATIONS

BACKGROUND OF THE INVENTION

1. Field of the Invention

The present invention relates to the field of optical receivers for free-space signal transmission. In particular, the present invention provides a novel optical receiver which utilizes an optical taper to achieve a high tolerance to angular misalignment, while supporting a high bit rate by permitting the use of a small surface area photodetector.

Optical tapers have been mainly used in integrated optical devices for the coupling of lightwaves between waveguides of different shapes and sizes. Known applications are concerned with the use of fiber tapers to improve the axial and transversal displacement tolerance and to reduce the dust sensitivity of single mode fibers in the case of single mode fiber coupling.

The present invention, however, relates to free space atmospheric optical links. A typical receiver for a free space/atmospheric optical link uses an objective lens or a mirror to collect and focus a signal beam on a photodetector, usually a photodiode. In order to achieve a high bit rate, one must use a photodetector with a very small active area (as small as 0.01 mm$^2$ or smaller) because the diode capacitance is directly proportional to its active area. This makes the receiver alignment very difficult. For example, the angular misalignment of a receiver telescope with a focal length L=1 m and a photodetector with a lateral dimension d=0.1 mm must be smaller than d/L, namely $10^{-4}$ rad (about 20 second), which means that turbulence of atmosphere or even a small amount of jitter may cause complete loss of the signal beam.

SUMMARY OF THE INVENTION

The object of the present invention is to provide a receiver for use in a free space/atmospheric link which overcomes the above-noted difficulties associated with known receivers.

The present invention achieves its object by introducing an optical taper between the objective lens and the photodetector. This improves angular tolerance by nearly the ratio of the diameter of the larger end (the "head") to that of the smaller end (the "tail") of the taper, while maintaining a high bit rate. Since light can be totally or partially guided through the taper to a photodetector attached to its tail, a better tolerance to misalignment is the result of the relatively larger dimension of the taper head. In other words, the combination of a taper and a small area photodetector results in a composite photodetector having a larger receiving area but the same capacitance. It is also noticed that no severe pulse smear results even in presence of higher order modes, because of the short length of the taper.

In one broad aspect, the present invention relates to, for use as an optical receiver, the combination of: i) a photodiode having a surface area of suitable dimensions to permit reception of a signal at a high bit rate; and ii) an optical taper having a head and a tail, said head being of greater diameter than said tail, and co-axial with said tail, said tail being aligned with said photodiode.

DESCRIPTION OF THE DRAWINGS

In drawings which illustrate the present invention by way of example.

DESCRIPTION OF THE INVENTION

Figure 1:
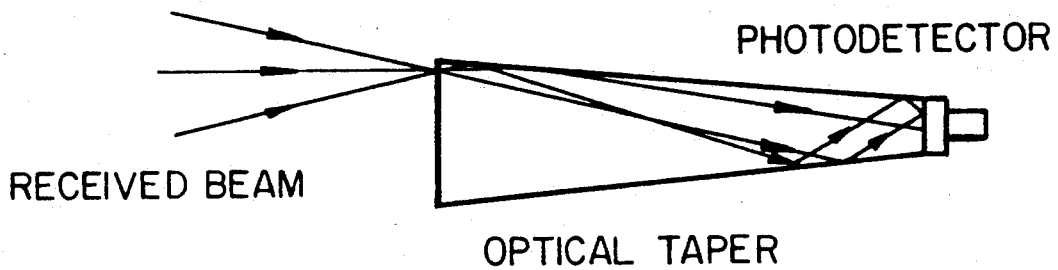
FIG. 1 is a schematic of an optical taper—photodetector combination embodying the present invention.
Figure 2:
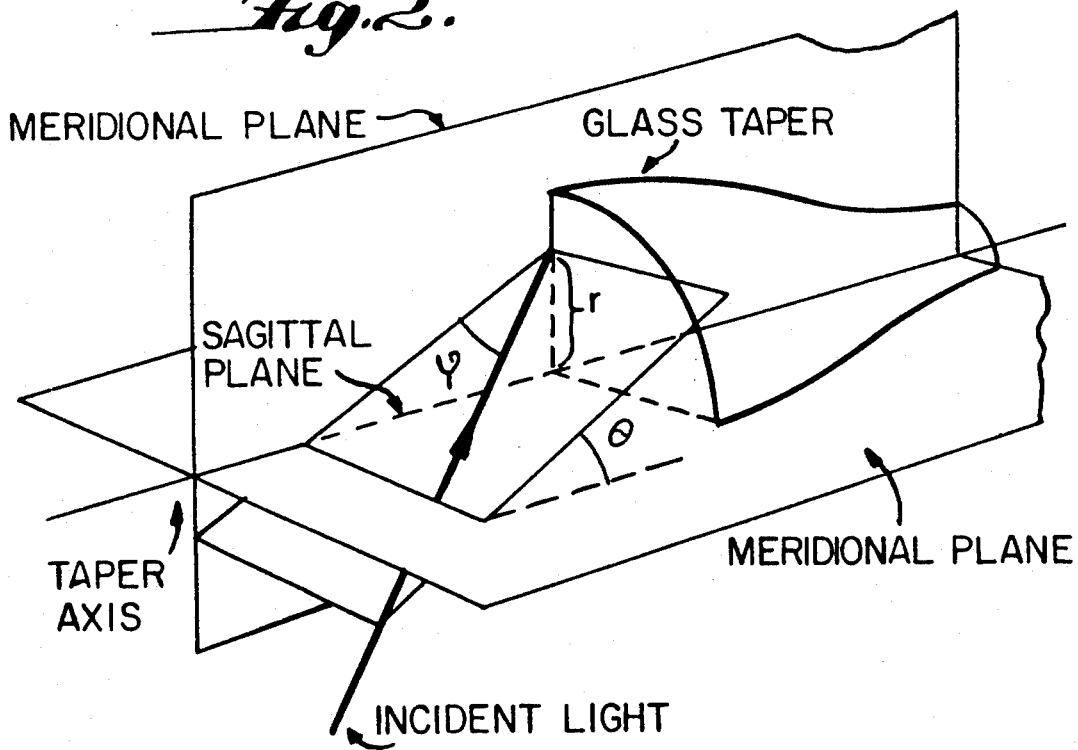
FIG. 2 is a schematic of a ray tracing model for an optical taper.
Figure 3:
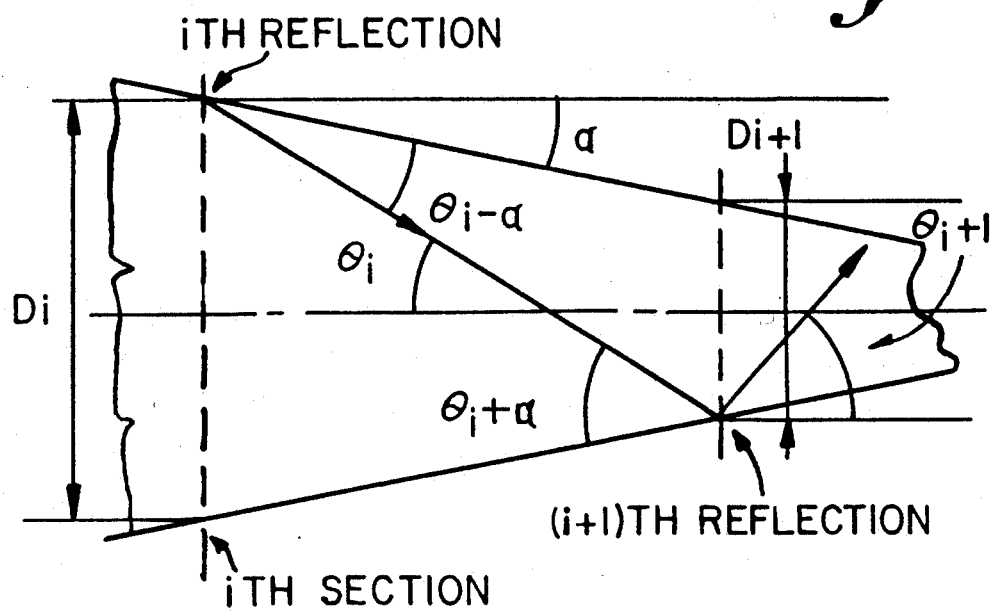
FIG. 3 is a detail of the i$^{TH}$ segment in the model of FIG. 2.

Referring first to FIGS. 1, 2 and 3, the present invention, utilizing, as it does, optical tapers, shall be discussed with reference to ray tracing. This approach, it will be noted, is a departure from most theoretical analysis of optical tapers, which has employed mode theory. See, for instance: D. Marcuse, "Mode Conversion in Optical Fibres with Monotonically Increasing Core Radius", J. Lightwave Technol. vol. LT-5, No. 1, pp. 125-133, 1987; N. Amitay, H. M. Presby, "Optical Fibre Up-Tapers Modeling and Performance Analysis," J. Lightwave Technol., vol. 7 No. 1, pp. 131-137, 1989; N. Amitay, H. M. Presby, "Optical Fibre Up-Tapers with Index Perturbations-Performance Analysis", J. Lightwave Technol., vol. 7, No. 7, pp. 1055-1062, 1989; and Bernd Hillerrich and Joachim Guttmann, "Deterioration of Taper Lens Performance due to Taper Asymmetry", J. Lightwave Technol. vol. 7, No. 1, pp. 99-104, 1989.

In this particular case, mode theory is not utilized because of two distinctive features of the tapers employed in the present invention:

1. Large dimensions. The diameter of the head of the taper in this application is in the order of several millimeters, while the tail is in the range of several hundred micrometers.

2. Strong guide. There is no cladding around the present taper. The difference in refractive indecies between the two adjacent media at the boundary is the same as that between air and glass instead of two different glasses, and thus much greater. Therefore, the maximum propagation angle—the highest angle between a guided light ray and the axis of the taper—can be much larger. Moreover, no cladding is needed in this application to protect the core, since it can be easily enclosed in a properly designed case.

As a consequence, there exist too many guided modes in the taper to perform any analysis using mode theory, but the large number of modes makes it possible to get accurate results by employing ray tracing techniques which are developed for conventional or geometric optical designs and analysis.

Generally speaking, ray-tracing in a taper is a rather complicated problem. At least three parameters must be used to specify every single light ray (angles $\theta$ and $\phi$ for the orientation, and length r- the lateral distance between the axis of the taper and the incident point). Also the boundary of the taper is three dimensional. In order to discuss the present invention, the following shall be assumed:

1) When r is given, only the light rays in meridional plane ($\phi=0$) need to be considered, because they are more likely to exceed the critical angle of total internal reflection and cause loss of power. In other words, if the guiding condition of the meridional rays is satisfied, i.e., these rays do not exceed the critical total internal reflection angle while reflected by the boundary, the sagittal rays ($\phi\neq 0$) with the same $\theta$ will be assured to be guided by the taper. This consideration will reduce the problem to a two dimensional one.

2) When $\theta$ and $\phi$ are given, only the light ray impinging upon the edge of the taper head should be considered in calculations, because if the guiding condition is satisfied for this ray, other light rays incident on any location closer to the centre are assured to stay in the taper, provided they have the same incident angle $\theta$ as the one at the edge.

3) The taper can be approximately considered as a linear taper characterized by angle $\alpha$ and refractive index n.

Figure 2A:
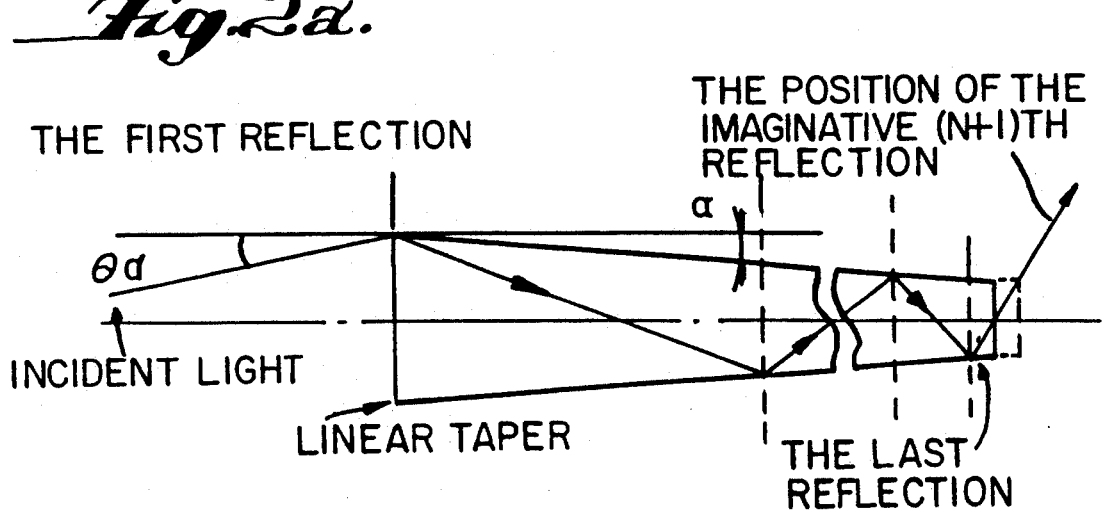
FIG. 2a is a schematic of a simplified ray tracing model for an optical taper.

With these three considerations, ray tracing is simplified as depicted in FIG. 2a, from which an analytical solution may be drawn.

An expression for the condition under which the light ray in FIG. 2a will ultimately reach the end of the taper tail along a zigzag path without any guiding loss may be deduced as follows: Postulate cutting the taper in FIG. 2a into N sections at the points where the light ray is reflected. The $i^{TH}$ section is depicted in FIG. 3. It is the segment between the $i^{TH}$ and the (i+1)th reflection. It can be shown that $$\theta_{i+1} = \theta_i + 2\alpha, \quad i = 0, 1, 2, \ldots, N \quad (1)$$

accordingly, every time a light ray is reflected from the boundary of the taper, the propagation angle $\theta_i$ will increase by an amount $2\alpha$. So the number of times the light ray is totally reflected will be limited by the critical total internal reflection angle $\theta_T$. It can also be proved that $$\frac{D_i}{D_{i+1}} = \frac{\sin(\Theta_1 + \alpha)}{\sin(\Theta_1 - \alpha)} \quad (2)$$

$$i = 1, 2, \ldots, N$$

From this expression, the ratio of the diameter corresponding to the first reflection $D_1$ to that corresponding to the (N+1)th reflection is $$\frac{D_1}{D_{N+1}} = \frac{D_1}{D_2} \frac{D_2}{D_3} \cdots \frac{D_N}{D_{N+1}} = \quad (3)$$

$$\frac{\sin(\Theta_1 + \alpha)}{\sin(\Theta_1 - \alpha)} \frac{\sin(\Theta_2 + \alpha)}{\sin(\Theta_2 - \alpha)} \cdots \frac{\sin(\Theta_N + \alpha)}{\sin(\Theta_N - \alpha)} =$$

$$\frac{\sin(\Theta_N + \alpha)}{\sin(\Theta_1 - \alpha)} = \frac{\sin(\Theta_N + \alpha)}{\sin(\Theta_0 + \alpha)}$$

where $\theta_0$ is the angle of incidence.

If $\Phi_T = (\pi/2) - \theta_T$, where $\theta_T$ is the critical angle of the total internal reflection from glass to air, $\theta_N - \alpha \leq \Phi_T$ if we assume that the light ray is still totally reflected at the last (Nth) reflection. Then from (3), the improvement of the tolerance, i.e., the magnification M of the taper, which is defined as the ratio between the diameter of the head to that of the tail of the taper, must satisfy $$M \leq \frac{D_1}{D_{N+1}} \leq \frac{\sin(\Phi_T + 2\alpha)}{\sin(\Theta_0 + \alpha)} \quad (4)$$

where the first < sign is true for the case when the last segment is not long enough to accommodate the (N+1)th reflection. This expression is what is called the guiding condition, from which we can see:

1) The size of the taper has a limit when the size of the photodetector is given, because the magnification must be less than the ratio between the sinusoidals of two angles, $\Phi_T + 2\alpha$ and $\theta_0 + \alpha$. In practice, the taper is aligned with the axis of the objective lens of a receiver telescope, so $\theta_0 > 0$ for all light rays. Also, the condition $\Phi_T + 2\alpha < \pi/2$, which must be satisfied, as only light rays travelling forward to the detector are considered. Then from these two considerations and (4), there is an upper bound on M:

$$M \leq \frac{1}{\sin \alpha} \quad (5)$$

which only depends on the geometry of the taper, i.e., the angle $\alpha$. It is apparent that in the case of long distance transmission, one must employ a telescope, because the aperture of a taper cannot be made large enough to take the place of the objective lens (or mirror). But for short distance transmission there is still a possibility of not using a lens or mirror at all.

2) Metal or dielectric high reflectance coating may help to increase the effective value of the angle $\Phi_T$, and thus make M greater, but it may not help much because when $\Phi_T$ tends to $\pi/2$, the rate of increase of $\sin\Phi_T$ tends to zero.

EXPERIMENTAL RESULTS

Figure 4:
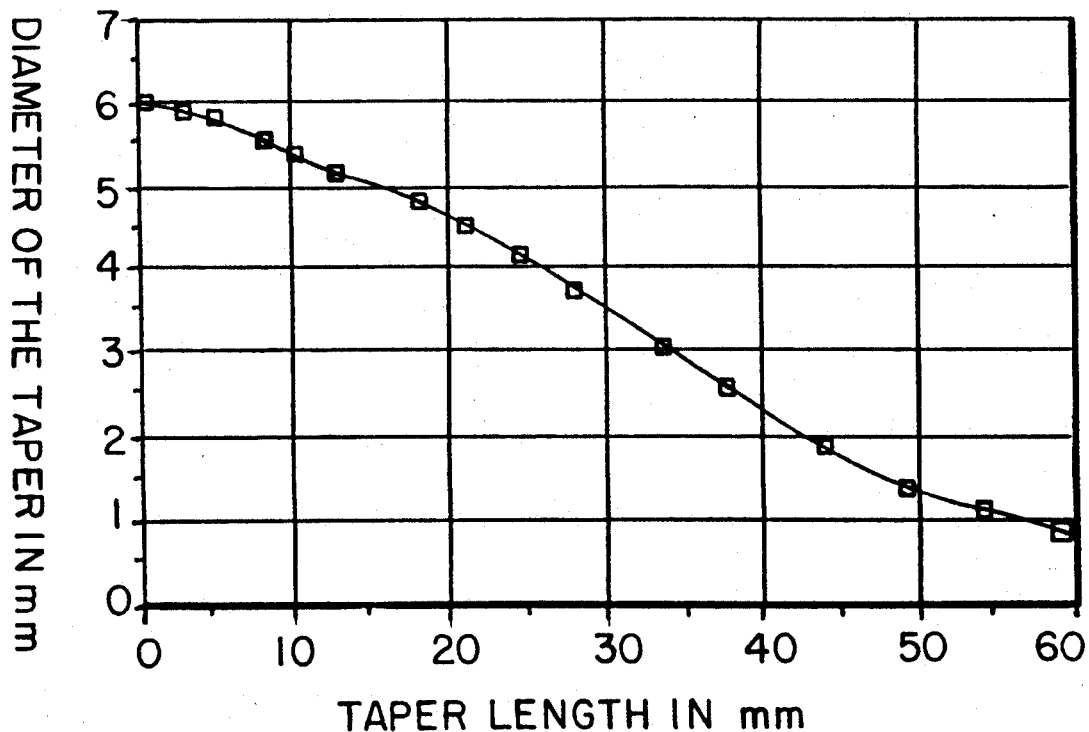
FIG. 4 is a graph plotting taper diameter (y) against length (x) for a taper suitable for use in the present invention.
Figure 5:
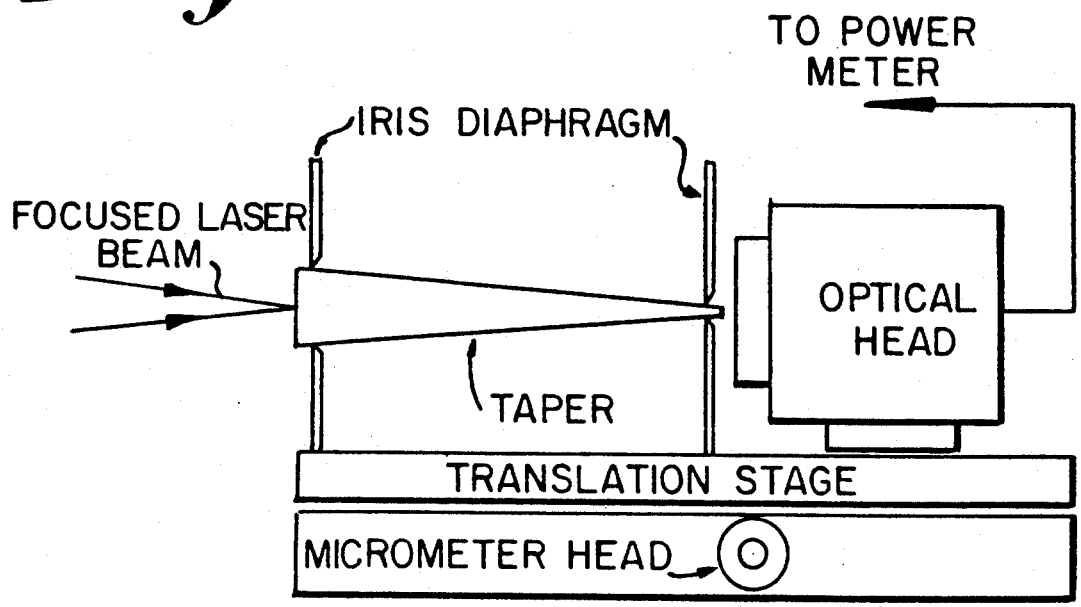
FIG. 5 is a schematic of a bench scale optical link embodying the present invention.

Turning now to the remainder of the drawings, the tapers used in the present invention were made by stretching heated silica glass rods with a diameter ranging from 3 mm to 6 mm. No cladding is applied on them for simplicity and stronger guiding ability. The diameter as a function of taper length was measured with a simple calliper. The result is shown in FIG. 4. The performance of the taper was measured with the experimental set-up shown in FIG. 5, where the platform carrying both the taper and the optical head can be shifted with a micrometer head to get the desired lateral displacement $\delta$. The laser beam has a wavelength of 1300 nm, and a f-number of 74, where the f-number is defined as the ratio of the base diameter of a light beam cone to its length.

Figure 6:
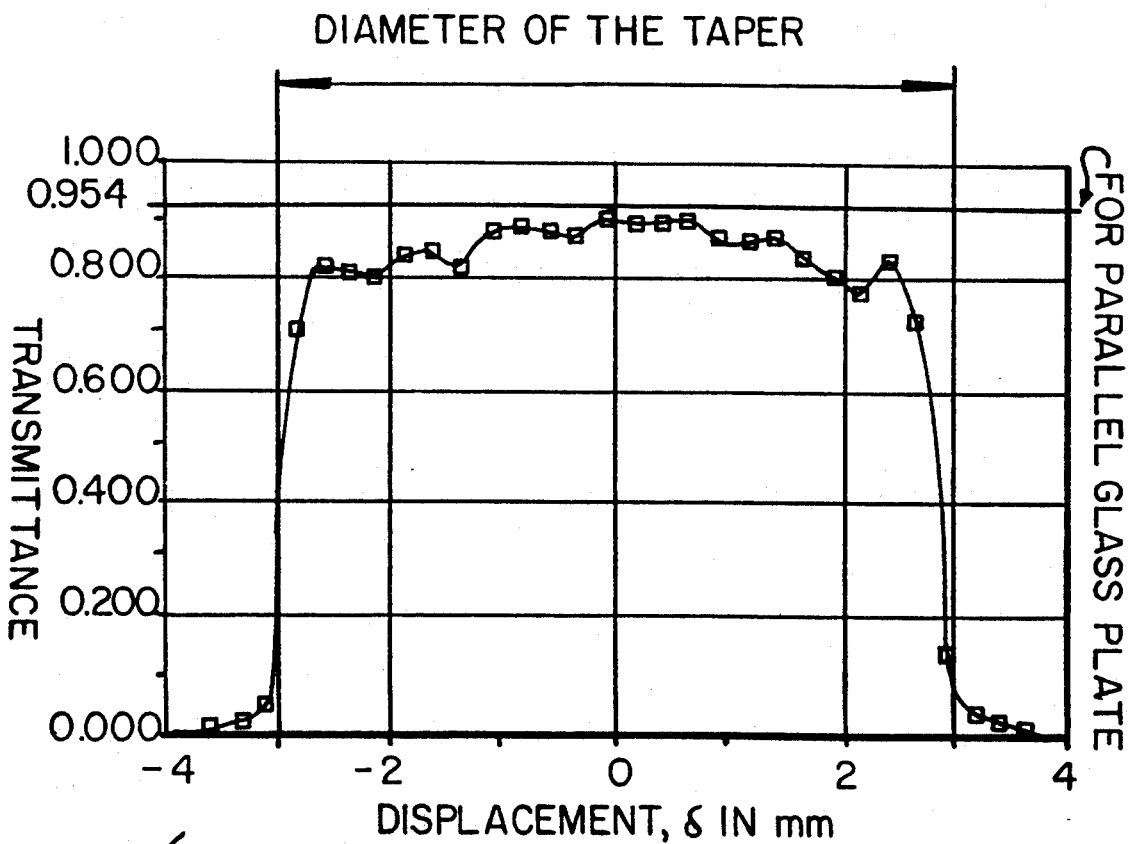
FIG. 6 is a graph plotting transmittance (y) against displacement (x) in mm, for the taper of FIG. 4.

The result of the measurement, for the sample characterised in FIG. 4, is plotted in FIG. 6, in which the vertical axis represents the transmittance, i.e., the power received by the optical power meter at the taper tail normalized to the power of the incident light. The horizontal axis represents the lateral displacement $\delta$ of the incident light beam from the central position which is directly related to the angular displacement of the whole receiver by only a constant (focal length):

$$\delta = L\Delta\theta \quad (6)$$

For comparison, the same measurement was made when the taper was replaced by a parallel glass plate made of the same kind of material, with a thickness equal to the length of the taper. This result is also shown in FIG. 6, as a horizontal line corresponding to a normalized power of 0.954.

It can be seen from FIG. 6 that:

1. The maximum value of the transmittance is reached around $\delta = 0$ point, which is about 0.95 (about $-0.2$ dB), and is almost equal to the value for the parallel glass plate. This suggests that the loss is mainly introduced by the reflection on the surfaces of both ends of the taper and the absorption in the glass. Therefore, anti-reflection coatings at both ends and a preform of higher quality may help to reduce the loss.

2. The performance of the sample taper is remarkably good. The transmittance drops very slowly with respect to an increase in the displacement and the normalized power is greater than 0.8 (corresponding to a loss less than 1 dB) within the region with a diameter of about 5 mm. Applying the analysis outlined above to this sample taper (characterization shown in FIG. 4), from FIG. 4, the maximum value $\alpha \approx 0.13$ rad, $\Phi_T \approx 0.84$ rad for $n \approx 1.5$, and $\theta_0 \approx 0$ for the large f-number of the beam. From (4), $M \leq 6.9$, i.e., the diameter of the taper head should be less than $6.9 \times 0.9$ mm. This result is essentially acceptable considering that the taper used is not perfectly linear and that there are ripples on the surface because of its protypical nature. The drop of the gain can be easily understood by considering the fact that the incident beam contains a bundle of light rays with different incident angles $\theta_0$. When $\delta$ increases, $D_1$ in expression (4) increases, thus more and more light rays which have relatively larger incident angle $\theta_0$ can not satisfy the guiding condition and start to radiate light power out of the taper. Therefore, the loss increases.

3. The received power decreases very fast in the area around the edge of the taper. This is explained by the large f-number of the incident laser beam which could be approximately characterized by a single light ray.

If the taper is so designed that the guiding condition is just satisfied when $\theta_0 = 0$, at least one half of the total incident power will be guided to the photodetector without any loss, provided that the incident beam has a symmetric power distribution about its central ray. This is because at least for half of the light rays $\theta_0 < 0$. These rays meet condition (4), and are totally reflected by the boundary of the taper. In fact, Expression (4) can be further simplified by considering this case and assuming that the f-number of the objective goes to infinity. In this limit, only one light ray with $\theta = 0$ and $\phi = 0$ needs be considered, and expression (4) becomes:

$$M < \frac{\sin(\Phi_T + 2\alpha)}{\sin \alpha} \qquad (7)$$

This can be called "less-than-half-loss condition", and it is the simplest expression for the estimation of the performance of optical tapers for this application.

In the practical embodiment, a taper is combined with a photodetector having a suitably small surface area for the bit rate reception desired. A typical combination will be a 1 mm $\times$ 1 mm photodetector, combined with a six centimeter taper having a six millimeter head and a 0.8 millimeter tail. The taper and photodetector may be permanently aligned in a casing made of a rigid material such as a plastic. As noted above, a telescope may be used if the receiver is for reception of a signal from a relatively long distance.

It is to be understood that the examples described above are not meant to limit the scope of the present invention. It is expected that numerous variants will be obvious to the person skilled in the optical receiver design art, without any departure from the spirit of the present invention. The appended claims, properly construed, form the only limitation upon the scope of the present invention.

We claim:

1. For use as an optical receiver in a free space, an atmospheric link, or a free space and an atmospheric link, the combination of:
   i) a photodiode having a surface area of a size selected to permit reception of a signal at a high bit rate;
   ii) an optical taper having a head with a flat face and a tail, said head being of greater diameter than said tail, and axially aligned with said tail, said tail being axially aligned with said photodiode; and
   wherein the magnification M of the taper, being the ratio between the diameter of the head to the diameter of the tail, satisfies:

$$M \leq \frac{D_1}{D_{N+1}} \leq \frac{\sin(\Phi_T + 2\alpha)}{\sin(\theta_o + \alpha)}$$

where $\theta$ is the angle between a given ray of light at the head of the taper and linear axis of the taper, $\alpha$ is the angle between the side surface of the taper and the linear axis thereof, $\Phi_T = \pi/2 \, \theta_T$ where $\theta_T$ is the critical angle of the total internal reflection from the internal material of the taper relative to the surrounding atmosphere, $D_1$ is the diameter of the taper at its head and $D_{N+1}$ is the diameter of the taper near its tail.

2. The combination claimed in claim 1, wherein the ratio of the diameter of the head of said taper to the diameter of the tail of said taper is in the range of 4:1 to 10:1.

3. The combination claimed in claim 1, wherein the ratio of the diameter of the head of said taper to the diameter of the tail of said taper is in the range of 6:1 to 8:1.

4. The combination claimed in claim 1, wherein the ratio of the diameter of the head of said taper to the diameter of the tail of said taper is about 7.5:1.1.

5. An optical taper for use in connection with a photodiode having a surface area of a size selected to permit reception of an optical signal at a high it rate, said optical taper having a head and a tail, said head being of greater diameter than, and axially aligned with said tail wherein the magnification M of the taper, being the ratio between the diameter of the head to the diameter of the tail, satisfies:

$$M \leq \frac{D_1}{D_{N+1}} \leq \frac{\sin(\Phi_T + 2\alpha)}{\sin(\theta_o + \alpha)}$$

where $\theta$ is the angle between a given ray of light at the head of the taper and the linear axis of the taper, $\alpha$ is the angle between the side surface of the taper and the linear axis thereof, $\Phi_T = \pi/2 \, \theta_T$ where $\theta_T$ is the critical angle of the total internal reflection from the internal material of the taper relative to the surrounding atmosphere, $D_i$ is the diameter of the taper at its head and $D_{N+1}$ is the diameter of the taper near its tail.

6. The taper claimed in claim 5, wherein the ratio of the diameter of the head of said taper to the diameter of the tail of said taper is in the range of 4:1 to 10:1.

7. The taper claimed in claim 5, wherein the ratio of the diameter of the head of said taper to the diameter of the tail of said taper is in the range of 6:1 to 8:1.

8. The taper claimed in claim 5, wherein the ratio of the diameter of the head of said taper to the diameter of the tail of said taper is about 7.5:1.0.

* * * * *